(12) United States Patent
Scott

(10) Patent No.: US 7,107,719 B1
(45) Date of Patent: Sep. 19, 2006

(54) SNAP-LOCK CONNECTOR FOR SOFT BAIT FISH LURE

(76) Inventor: Jason Scott, 1300 N. Mariposa Rd., Space #2, Nogales, AZ (US) 85621

( * ) Notice: Subject to any disclaimer, the term of this patent is extended or adjusted under 35 U.S.C. 154(b) by 0 days.

(21) Appl. No.: 10/998,785

(22) Filed: Nov. 27, 2004

Related U.S. Application Data

(60) Provisional application No. 60/525,154, filed on Nov. 28, 2003.

(51) Int. Cl.
*A01K 85/00* (2006.01)

(52) U.S. Cl. .................. 43/42.09; 43/42.24; 43/42.26; 43/42.28

(58) Field of Classification Search .................... 43/42, 43/42.09, 42.15, 42.22, 42.35, 42.47, 42.24, 43/42.26, 42.28; 403/353; A01K 85/00
See application file for complete search history.

(56) References Cited

U.S. PATENT DOCUMENTS

| | | | | |
|---|---|---|---|---|
| 2,556,533 A | * | 6/1951 | Graaten | ...................... 43/42.15 |
| 4,258,464 A | * | 3/1981 | Ullman, Jr. | ............... 29/525.01 |
| 5,381,620 A | * | 1/1995 | Gibbs | ........................ 43/42.09 |
| 5,815,978 A | * | 10/1998 | Huddleston | ................ 43/42.09 |
| 5,911,571 A | * | 6/1999 | Wittbrot, III | .............. 43/42.15 |
| 6,554,527 B1 | * | 4/2003 | O'Donnell et al. | ......... 403/353 |

* cited by examiner

*Primary Examiner*—Darren W. Ark
*Assistant Examiner*—John Holman
(74) *Attorney, Agent, or Firm*—Timothy M. Barlow

(57) ABSTRACT

A soft bait fish lure of the two-component variety having a rigid, hollow head and a soft and flexible rearmost body and tail fin of the lure. Each component includes a flat plate having opposing surfaces which are joined together by a snap-lock device. The head plate includes a pair of projections arranged in fixed spaced-apart relationship with each projection having a tapered head spaced from the surface of the plate. The plate associated with the rearmost and fin portion of the lure includes a pair of apertures for aligning with the projections and permits insertion of the projections through the apertures wherein a shank of each projection is then manipulated into a keyway on each of the respective apertures to establish proper alignment between the plates and the component parts as well as to provide a fixed securement therebetween.

8 Claims, 2 Drawing Sheets

SNAP-LOCK CONNECTOR FOR SOFT BAIT FISH LURE

Priority Claimed on Ser. No. 60/525,154 filed Nov. 28, 2003 PENDING.

BACKGROUND OF THE INVENTION

1. Field of the Invention

The present invention relates to the field of two-part fishing lures, having a rearmost part composed of soft and flexible material and wherein the second part is a rigid, hollow component, and more particularly to a novel snap-lock connector for joining the two in releasable securement.

2. Brief Description of the Prior Art

It has been a conventional practice in the sport of fishing to use a variety of fishing lures to attract fish in an attempt to catch such fish. One such lure is disclosed in U.S. Design Pat. 369,200 and is referred to as a hard bait lure since the two parts of the lure are composed of hard and rigid materials. The two parts are joined together by an eyelet and hook arrangement so that the rearmost part of the lure will pivot on the hook and eyelet arrangement to represent a swimming fish. Such a connection between the two parts is cumbersome and does not provide for a realistic securement between the opposing surfaces of the two parts and the lure is not especially effective.

An attempt to provide a realistic and visually acceptable securement between the two lure parts is set forth in the disclosure of U.S. Pat. No. 5,815,978, wherein the swimming of the fish is more accurately experienced during a fishing procedure by providing a more realistic fish lure which joins opposing surfaces of the two parts by means of an adhesive. The disclosure also shows a guide means for aligning the two parts together during the assembly procedure. Such an arrangement also permits the two parts to be separated after extensive use so that the soft and flexible part, representing the tail or fins of the lure, may be replaced by a new soft and flexible part.

Problems and difficulties have been encountered with the latter soft bait lure which stem largely from the fact that it is still a difficult procedure to align the two parts together preparatory for adhesive joining in spite of the guides provided and the use of an adhesive has a tendency to tear, mar, or otherwise damage the component parts so that re-use or acceptance of a replacement part is not practical. Also, the use of an adhesive and the conventional alignment procedure for joining the two lure components together requires intensive labor operations.

Therefore, a long-standing need has existed to provide a more realistic fish lure of the soft bait fish lure variety which not only presents a more visual and realistic fish presentation but permits the lure to appear to swim so as to simulate the swimming of an actual fish. An attachment means for releasably securing the two-lure component parts together should permit long wear and the capability of exchanging replacement component parts in a convenient and detachable securement.

SUMMARY OF THE INVENTION

Accordingly, the above problems and difficulties are avoided by the present invention which provides a novel soft bait fish lure of the two-component variety, wherein one component is composed of a rigid, hollow material representing the head of the fish, and the other component part is composed of a soft and flexible material, representing the rearmost body and tail fin of the lure. Each of the respective component parts includes a flat plate having opposing surfaces which are joined together by a snap-lock means. The plate associated with the head of the lure includes a pair of projections arranged in fixed, spaced-apart relationship, wherein each projection includes a tapered head spaced from the surface of the plate. The plate associated with the rearmost and fin portion of the lure includes a pair of apertures for aligning with the projections and which permit insertion of the projections through the apertures wherein a shank of each projection is then manipulated into a key way on each of the respective apertures to establish proper alignment between the plates and the component parts as well as to provide a fixed securement therebetween. A feature of the invention resides in providing a securement nub on the first plate which resides in an aperture on the second plate when securement has been achieved. A release mechanism is provided by employing a flexible latch on the second plate so that the second plate can be flexed to release the nub from the aperture in which it resides after securement so that the projections can be removed from the key ways into the enlarged apertures for removal.

Therefore, it is among the primary objects of the present invention to provide a novel soft bait fishing lure which includes a snap-lock mechanism for joining the components of a two-component part lure in such a way that the lure looks and feels similar to an actual fish.

Another object of the present invention is to provide a soft bait fishing lure that appears to swim while submerged as an added attraction to gaining the attention of a fish intended to be captured.

Yet another object is to provide a soft bait fish lure having a head component which is rigid but hollow and a rearmost body and tail portion which is soft and flexible and which further includes a snap-lock means for releasably joining the two component parts together in a snap-lock relationship.

Still another object resides in providing a latch mechanism for selectively securing and releasing a connection between the two-component parts of a fishing lure.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF PREFERRED EMBODIMENT

Figure 1:
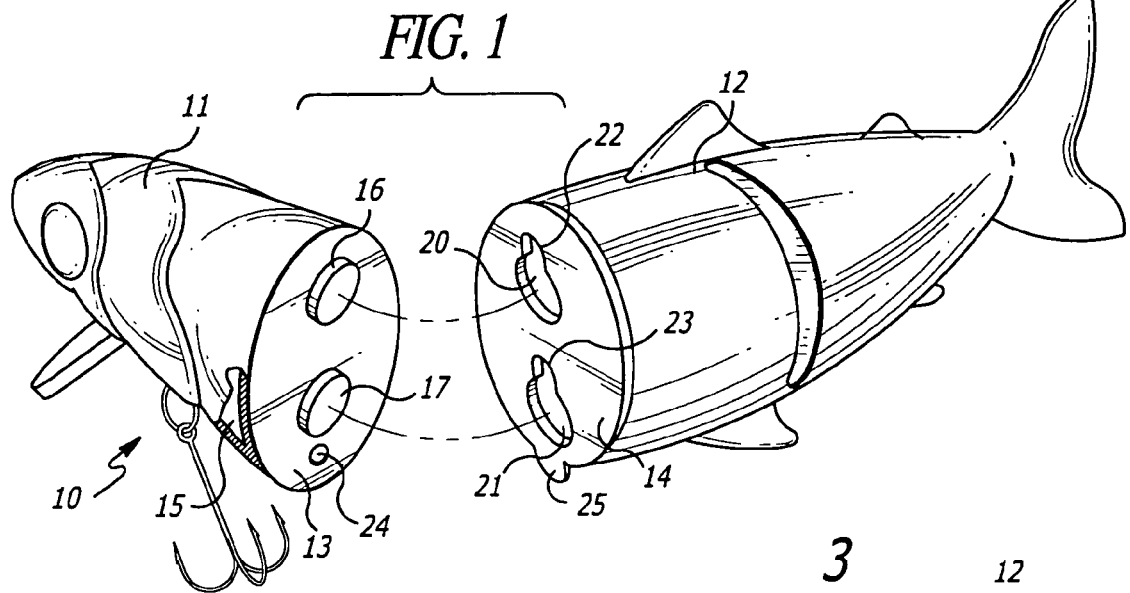
FIG. 1 is perspective exploded view of the two-component part fishing lure of the soft bait type employing the present invention.

Referring to FIG. 1, the novel soft bait fishing lure of the present invention is illustrated in the general direction of arrow 10 and is illustrated as comprising an elongated body having a head component part 11 which is composed of a hard and rigid material and a rearmost component part 12 composed of a soft, flexible material. The head component part 11 is formed with a cavity 15 making the head component part hollow while the rearmost component part 12 may be composed of a soft and pliable plastic such as hot melt "Plastisol" material which is readily available on the market. It can be seen that the head component part 11 is joined to the rearmost component part or tail 12 by joining the opposing and opposite surfaces of a head plate 13 and a tail plate 14. The joining represents immediate engagement of the surface areas of the two plates which are joined together utilizing a snap-lock means. In order to guide and align the component parts together during the joining procedure, a pair of spaced-apart projections 16 and 17 are employed which are indexed with and inserted into corresponding apertures 20 and 21 formed in the tail plate 14. It is to be particularly noted that the apertures 20 and 21 include keyway notches 22 and 23 respectively which form a part of the securement relationship between the pair of plates. A securement and release arrangement is employed including a securement nub 24 and a latch 25. The release arrangement provides a resistance to disconnect or release and also permits selected release for separation of the two plates.

Figure 2:
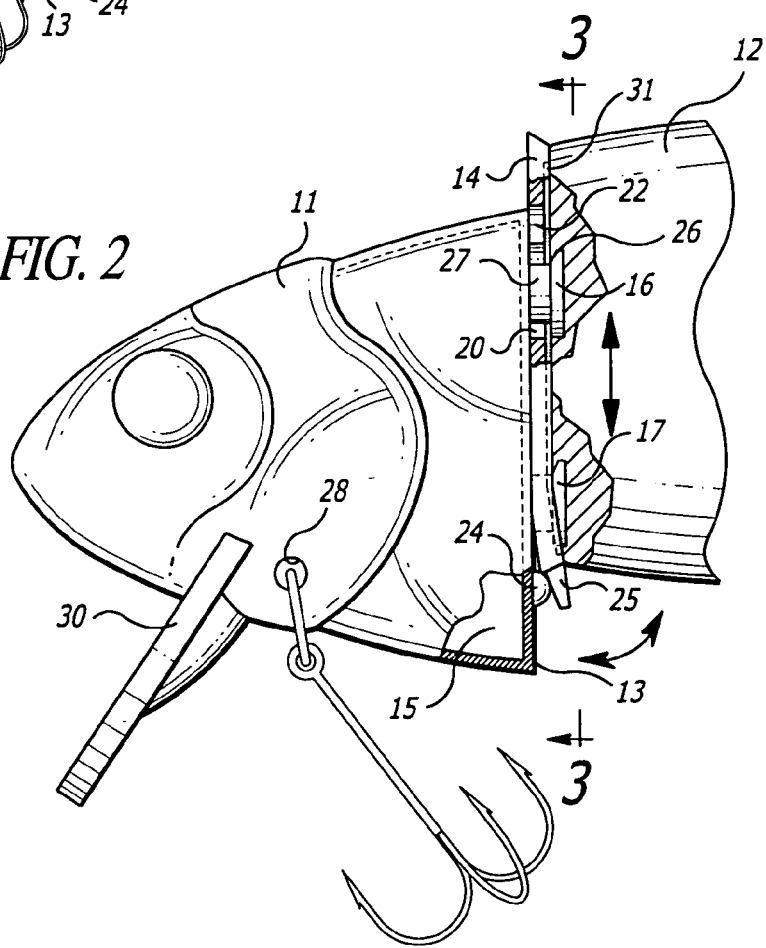
FIG. 2 is an enlarged, side-elevational view, partial in section, of the novel snap-lock mechanism in the process of releasably joining the two-component parts of the lure together.

Referring now in detail to FIG. 2, it can be seen that the head component part 11 is in a position to be attached to the tail component part 12 by the snap-lock connector. As illustrated, the projections 16 and 17 have been inserted through aligned and mated openings or apertures 20 and 21 respectively. It can be seen that the projections, such as projection 16, includes an undercut 26 on a distal flared portion and a shank 27. When plate 14 is pushed downwardly, the shank of each projection will enter the keyway notches 22 and 23 respectively in a tight interference fit. Simultaneously, the latch 25 will snap against the retainment nub 24 and as the plate 13 is moved upwardly, the nub fits within the opening 21 as more clearly illustrated in FIG. 3. The nub 24 is rounded and bears against the edge marginal region of the opening 21 to provide an interference fit and a releasable locking arrangement between the two plates.

FIG. 2 further illustrates that an opening 28 is available in the head portion or component of the lure through which a suitable line, hook means or the like, may be placed. Also, the head component part 11 includes an angled dive plate 30 which assists the lure to remain submerged as the lure is pulled through the water. The unique feature concerning dive plate 30 resides in its flexibility so that it may be slightly turned to the right or left in order to determine direction of lure travel when pulled in a submerged condition through the water. If desired, a weighted element may be placed in the head should it be desirable that the lure be submerged in deeper water.

Figure 3:
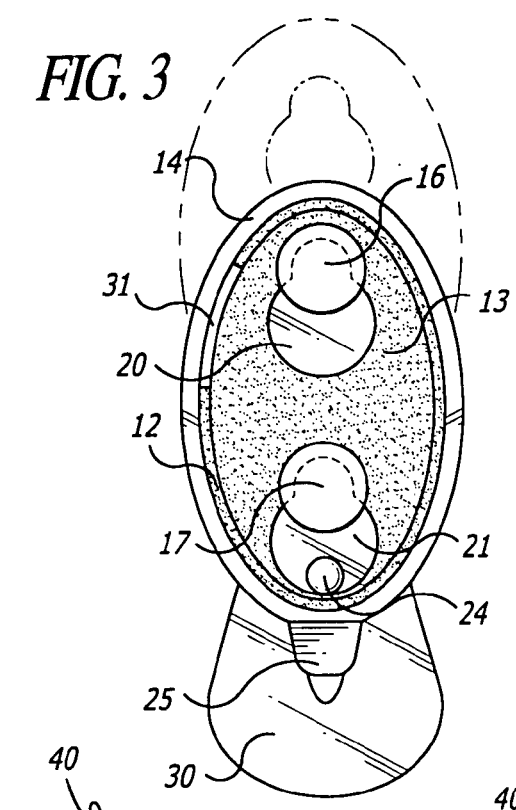
FIG. 3 is a transverse, cross-sectional view of the snap-lock mechanism illustrated in FIG. 2 as taken in the direction of arrows 3—3 thereof and completely connected.

Referring now in detail to FIG. 3, it can be seen that the projections 16 and 17 have been inserted through the spaced-apart openings 20 and 21 and when the shanks of the projections are urged into the keyways 22 and 23, an interference fit occurs and the edge marginal region of each keyway slips under the undercut 26 as the shank proceeds into the keyway. Also, FIGS. 2 and 3 illustrate a slight open groove 31 in the edge marginal region of plate 14 to which the soft material of the tail body 12 is attached by conventional means.

In view of the foregoing, it can be seen that the snap-lock arrangement for the two-component or part lure is the next generation of ultra-realistic soft bait lures that simulate the natural look and movement of live bait. The durable hard head component part 11 provides the side-to-side motion, while the replaceable soft body component part 12 provides the fluent, seductive swimming motion that predator fish find irresistible. The snap-on connector for the head component part and the tail body component part makes replacing the soft body tail easier than ever. Only a few seconds is required and no adhesive, curing time or the like is needed.

The present invention features the plastic connector of a snap-lock type which is attached to the rear surface of the tail component and the backside of the head component. The tail body just snaps into place. To release the tail body, pull back on the latch that is snapped in place so that it is exposed on the underside. Lightly ply the head and tail apart and slide the tail up and off of the head component. Also, in order to "tune" the soft bait lure of the present invention, the user ties the fishing line directly onto the front head part, such as through opening 28. Next, the fisherman will cast the lure about 15 feet in front of his station and retrieve the lure back at a fast speed. Next, if the lure appears to swim or turn up to the surface of the water to the fisherman's right as he is retrieving the lure, he then gradually bends the eyelet to the left. The fisherman does the opposite if the lure is swimming up to his left then the fisherman would bend the eyelet to the right. Steps two and three are repeated until the lure is swimming straight back to the fisherman at a fast speed.

Figure 4:
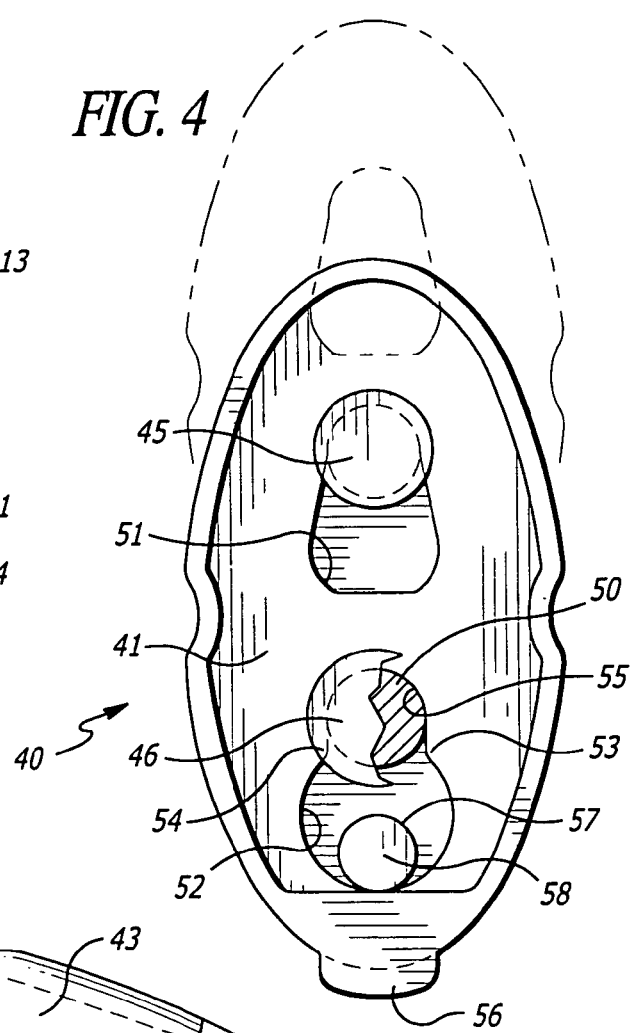
FIGS. 4 and 5 are illustrations of another version of a snap-lock connector for joining a tail component with a head component of a fishing lure.
Figure 5:
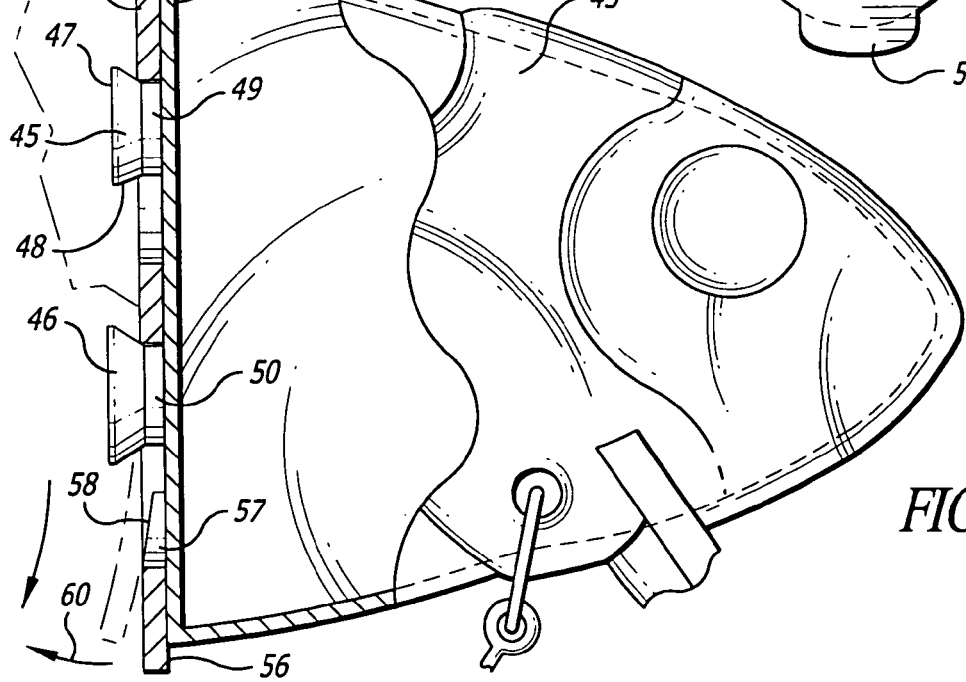

Another version of the invention is illustrated in FIGS. 4 and 5 in the direction of arrow 40 wherein a first tail plate 41 is attached to a soft, flexible tail component 42. A hard, rigid head component 43 includes a second or head plate 44 having a pair of projections 45 and 46 extending outwardly in a cantilevered fashion. Each projection is provided with an enlarged flange 47 which is undercut at numeral 48 and each projection is supported on a shank 49 and a shank 50.

The first or tail plate 41 is provided with a pair of oblong openings 51 and 52 that insertably receive the projections 45 and 46 so that the flange of each projection is captured by the edge marginal region of the openings. At least one opening, such as opening 52, includes a narrow gap defined by plate portions 53 and 54 arranged in opposition with respect to each other. Therefore, as the plate 41 is moved downwardly, the shank of at least projection 46 snaps past the portions 53 and 54 into an extended portion or notch of opening 52 identified as opening portion 55.

The downward movement of tail plate 41 causes both projections to butt against the top of openings 51 and 52 and be retained therein by plate portions 53 and 54.

A releasable lock means is provided by latch 56 which rides over a ramp nub element 57 that has a sloping surface or ramp 58. The element 57 is within the opening 52 and serves as a catch for the latch 56 to lock plates 41 and 44 together. To unlock, the latch is manually moved or flexed in the direction of arrow 60 which removes the latched engagement of the tail plate 41 with the element 57 on the head plate so that the plate 41 can be moved upwardly to forcibly urge the projection past the narrow gap between the portions 53 and 54.

The tail component can be separated from the head component and replaced with a new tail component.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A fish lure having a connector for joining a hard head to a soft tail comprising:
   a rigid hard head component;
   a soft flexible tail component;
   a head plate secured to said hard head component of said lure;
   a tail plate secured to said soft flexible tail component of said lure;
   a pair of projections carried on said head plate arranged in fixed spaced-apart relationship and outwardly projecting therefrom to terminate with a flared distal portion;
   a pair of openings provided on said tail plate in fixed spaced-apart relationship and adapted to be registered with and to insertably receive said pair of projections;
   said projections in an insertable engagement with said openings providing a detachable engagement between said head plate and said tail plate;
   where each of said openings in said plate includes a notch;
   where each projection includes a shank carrying said flared distal portion whereby manipulation of said head plate respective to said tail plate urges said shanks into said notches for capturing said flared distal portions behind said tail plate; and
   where each of said flared distal portions includes an angular undercut slidably engageable with said tail plate, where the head plate and tail plate slide against and parallel to each other to engage the head plate to the tail plate.

2. The connector defined in claim 1 including:
   a releasable latch means cooperatively carried on said head plate and said tail plate for retaining said projections and said openings together.

3. The connector defined in claim 2 wherein:
   said latch means includes a nub carried on said head plate immediately adjacent a selected one of said pair of projections and a flexible latch carried on said tail plate; and
   said latch manually deployable to flex said tail plate for insertion of said nub through a selected one of said pair of openings whereby said nub serves as a retainer to maintain said head plate and said tail plate in a connected position.

4. The connector defined in claim 3 including:
   a dive plate disposed on said head downwardly depending at an angle with respect to said head plate.

5. A soft bait fish lure comprising:
   a rigid hard head component;
   a soft flexible tail component adapted to be detachably connectable with said head component to provide unitary construction;
   a first plate secured to said head component having a pair of projections in fixed spaced-apart relationship and each projection having a shank terminating at a distal end in an undercut flange;
   a second plate secured to said tail component having a pair of openings in fixed spaced-apart relationship whereby said projections and said openings are registrable for mated insertion; and
   each of said openings having a notch for insertably receiving said shanks in sliding relationship whereby said flanges reside behind said second plate to releasably retain head component and said tail component together in said unitary construction, where the head plate and tail plate slide against and parallel to each other to engage the head plate to the tail plate;
   a latch means carried on said head component and on said tail component for releasably retaining said head component and said tail component together;
   said latch means includes a nub secured on said head component and a flexible latch member carried on said tail component; and
   said nub being insertably received in a selected one of said pair of openings and said latch member being operable to release said nub from said selected openings.

6. The connector defined in claim 5 wherein:
   said latch means includes a nub element carried on said head component and a flexible latch member carried on said tail component; and
   said nub element having a sloping ramp surface reducing height towards said projection and said latch member riding on said ramp surface to release said tail plate from said projections.

7. A soft bait fish lure comprising:
   a rigid hard head component;
   a soft flexible tail component adapted to be detachably connectable with said head component to provide a unitary construction;
   a first plate secured to said head component having a pair of projections in fixed spaced-apart relationship and each projection having a shank terminating at a distal end in an undercut flange;
   a second plate secured to said tail component having a pair of openings in fixed spaced-apart relationship whereby said projections and said openings are registrable for mated insertion;
   at least one of said openings having a pair of edge marginal regions defining a narrow gap for insertably receiving said shanks in sliding relationship whereby said flanges reside behind said tail plate to releasably retain said head component and said tail component together in said unitary construction; and
   an internal latch means cooperatively carried on said head component and on said tail component for releasably locking said head component and said tail component together.

8. The connector defined in claim 7 wherein:
   said internal latch means includes a sloped ramp surface provided on a nub element carried on and projecting from said head plate;
   said nub element insertable into a selected one of said pair of openings and engageable with a selected edge marginal portion of said tail plate to lock said tail plate and said head plate together; and
   a flexible latch member carried on said tail plate adjacent said selected opening adapted to ride on said ramp surface and to snap lock over said nub element to releasably lock said tail plate to said head plate and to manually disengage from said nub element to unlock said internal latch means to separate said tail plate from said head plate.

* * * * *